United States Patent
Lockhart et al.

(10) Patent No.: US 10,799,047 B2
(45) Date of Patent: Oct. 13, 2020

(54) MAGNETIC DRINKING CUP

(71) Applicants: Lauren Lockhart, Vero Beach, FL (US); Romia C. Goff, Sr., Vero Beach, FL (US)

(72) Inventors: Lauren Lockhart, Vero Beach, FL (US); Romia C. Goff, Sr., Vero Beach, FL (US)

( * ) Notice: Subject to any disclaimer, the term of this patent is extended or adjusted under 35 U.S.C. 154(b) by 0 days.

(21) Appl. No.: 16/140,387

(22) Filed: Sep. 24, 2018

(65) Prior Publication Data

US 2019/0117000 A1    Apr. 25, 2019

Related U.S. Application Data (60) Provisional application No. 62/562,945, filed on Sep. 25, 2017.

(51) Int. Cl.
*A47G 19/22* (2006.01)
*B65D 43/02* (2006.01)
(Continued)

(52) U.S. Cl.
CPC ......... *A47G 19/2272* (2013.01); *A47G 19/02* (2013.01); *A47G 19/2266* (2013.01);
(Continued)

(58) Field of Classification Search
CPC .............. A47G 21/18; A47G 19/2272; A47G 19/2266; A47G 19/2222; A47G 19/2205;
(Continued)

(56) References Cited

U.S. PATENT DOCUMENTS

| 655,413 | A | | 8/1900 | Parkyn |
| 2,675,815 | A | | 10/1952 | Dale |
| 3,556,341 | A | | 1/1971 | Rains |
| 5,249,702 | A | * | 10/1993 | Topp ................. A47G 19/2266 215/229 |

(Continued)

FOREIGN PATENT DOCUMENTS

| CA | 2871904 A1 | * | 5/2016 | ............. A47J 43/27 |
| CH | 658438 A5 | * | 11/1986 | ............. B65D 51/00 |

(Continued)

OTHER PUBLICATIONS

Translation of CH658438A5, SASEB, Nov. 14, 1986, Figs. 1 and 4. (Year: 1986).*

*Primary Examiner* — Robert J Hicks
(74) *Attorney, Agent, or Firm* — Sinha-Marsh Law Firm, P.C.; Rita K. Sinha-Marsh (57) ABSTRACT

The present invention is directed to a magnetic drinking cup, containing magnetic and metal components. Many cups known in the prior art have screw top lids, which have tight and narrow crevices making the cleaning process cumbersome. If not cleaned immediately after use, it becomes challenging to remove the debris remaining in the cup, and in the crevices of the lid. These crevices create a trap for bacteria and mold. The same issues can arise with reusable straws. There are not many tools on the market that can clean a straw thoroughly from top to bottom. If all contents are not removed from the straw, then it becomes a petri dish of bacteria; and if moisture remains, then mold will have the ability to grow. This invention provides fewer areas where bacteria and mold can flourish due to a magnetic seal instead of a screw top seal.

10 Claims, 6 Drawing Sheets

(51) Int. Cl.
    *B65D 53/02*     (2006.01)
    *A47G 19/02*     (2006.01)
    *B65D 1/26*     (2006.01)

(52) U.S. Cl.
    CPC .......... *B65D 1/265* (2013.01); *B65D 43/0202* (2013.01); *B65D 53/02* (2013.01); *A47G 2200/10* (2013.01); *A47G 2200/106* (2013.01); *B65D 2231/022* (2013.01); *B65D 2313/04* (2013.01)

(58) Field of Classification Search
    CPC .... A47G 19/02; B65D 1/265; B65D 81/3865; B65D 43/0202; B65D 43/02; B65D 53/02; B65D 51/24; B65D 45/00
    USPC ........ 215/229, 228, 274, 273; 220/483, 709, 220/705, 230, 212, 319, 315; 206/217; D9/435, 436; D7/300.2
    See application file for complete search history.

(56) References Cited

U.S. PATENT DOCUMENTS

| | | | |
|---|---|---|---|
| 6,379,018 | B1 | 4/2002 | Rycroft et al. |
| 7,607,430 | B2 * | 10/2009 | Davis .................... H01F 7/0263 128/200.11 |
| D753,950 | S | 4/2016 | Feeley et al. |
| 2003/0155365 | A1 * | 8/2003 | Llorente Lecue ... B65D 43/021 220/802 |
| 2007/0012697 | A1 * | 1/2007 | Holcomb ........... A47G 19/2272 220/203.21 |
| 2008/0128429 | A1 | 6/2008 | Towery et al. |
| 2017/0253363 | A1 | 9/2017 | Feeley et al. |
| 2017/0274330 | A1 * | 9/2017 | Cheng ................. B01F 3/04794 |

FOREIGN PATENT DOCUMENTS

| | | | | |
|---|---|---|---|---|
| EP | 2489607 | A1 * | 8/2012 | ......... B65D 17/4012 |
| JP | 01167055 | A * | 6/1989 | |

* cited by examiner

MAGNETIC DRINKING CUP

BACKGROUND OF INVENTION

Bacteria and mold can be found everywhere. Some bacteria can help with the digestion of food, destroy disease-causing cells, and assist with supplying needed vitamins for our bodies. On the other hand, some bacteria such as *Streptococcus, Staphylococcus*, and *E. coli* can be infectious, and cause illnesses. Usually antibiotics are used to treat bacterial infections, but each time an antibiotic is taken, the chances of becoming immune to that particular bacteria increases. This resistance could cause an infection to spread for which an antibiotic cannot cure. In addition to bacteria, kitchens in particular can house mold spores. These mold spores can enter a home through doors, windows, air conditioning units, and heaters. Spores can latch onto people, pets, and objects and continue to grow when exposed to moisture, warmth, and food.

Many cups known in the prior art have screw top lids, which have tight and narrow crevices making the cleaning process cumbersome. If not cleaned immediately after use, it becomes challenging to remove the debris remaining in the cup, and around the inside of the lid. These small areas create a trap for bacteria and moisture to collect, leading to the development of mold if not cleaned and dried properly. The same challenges are seen with reusable straws. It is very difficult to remove remnants from small, and narrow spaces. There are not many tools on the market that can clean a straw thoroughly from top to bottom. If not all contents are removed from the straw and dried thoroughly, it becomes a petri dish of bacteria and mold to grow.

When traveling for daily activities with liquid in a cup, that cup and straw are exposed to different environments and temperatures at school, work, and inside and outside of a car. Additionally, when drinking, bacteria and germs from one's mouth are introduced to the cup and straw. From the naked eye, these bacteria and germs are not visible, but they can live on surfaces for hours and even days. All exposure detailed above creates a breeding environment for bacteria and mold to grow.

Symptoms of mold exposure can include: (1) nasal problems. This includes a stuffy or runny nose. Some children may also have a nosebleed due to this sinus irritation, while children and adults alike may have allergies to molds and will develop symptoms due to exposure; (2) respiratory problems. Mold may cause tightness in the chest, cough and wheezing, difficulty breathing, asthma, or worsen asthma in cases for children. (3) sore throat; (4) sneezing; and (5) headaches.

The best way to prevent bacteria and mold from developing, specifically in drinking cups, is to keep the surface areas clean and dry. Therefore, it is advantageous to develop a single method and a single apparatus that empowers a user to effectively clean all areas of a drinking cup with soap and water, and to remove leftover bacteria that may be lingering behind.

SUMMARY OF INVENTION

The present invention is directed to a magnetic drinking cup, which is a drinking cup containing magnetic components. The magnetic components allow for a tight seal and decrease the opportunity for bacteria to flourish in narrow and hard to reach areas. This invention allows for cleaning ease, and provides fewer areas where bacteria can flourish due to a magnetic seal instead of a screw top seal, or no seal at all. The drinking cup can be replaced with any storage container, including children's "sippy cups", Tupperware, or any food or beverage storage container that requires a tight seal.

The magnetic drinking cup houses a removable magnetic ring, which attracts to a metal component inside of the cup's lid. This magnetic attraction forms a tight seal between the lid and the cup. This magnetic closure eradicates the need for small grooves and tight spaces, which are found in screw top lids. At the time of cleaning, every area of the cup and lid can be easily accessible with any choice of disinfectant, soap, a paper towel, a clean cloth, a disinfectant wipe, or any cleaning product of choice.

When it comes to reusable straws, a magnetic component housed along the vertical axis of the straw allows for the straw to unfold so that the inside can be wiped down, removing all debris. There is no longer a need for tiny brushes that are unable to reach the entire circumference or length of the straw for proper cleaning.

BRIEF DESCRIPTION

DETAILED DESCRIPTION

Figure 1:
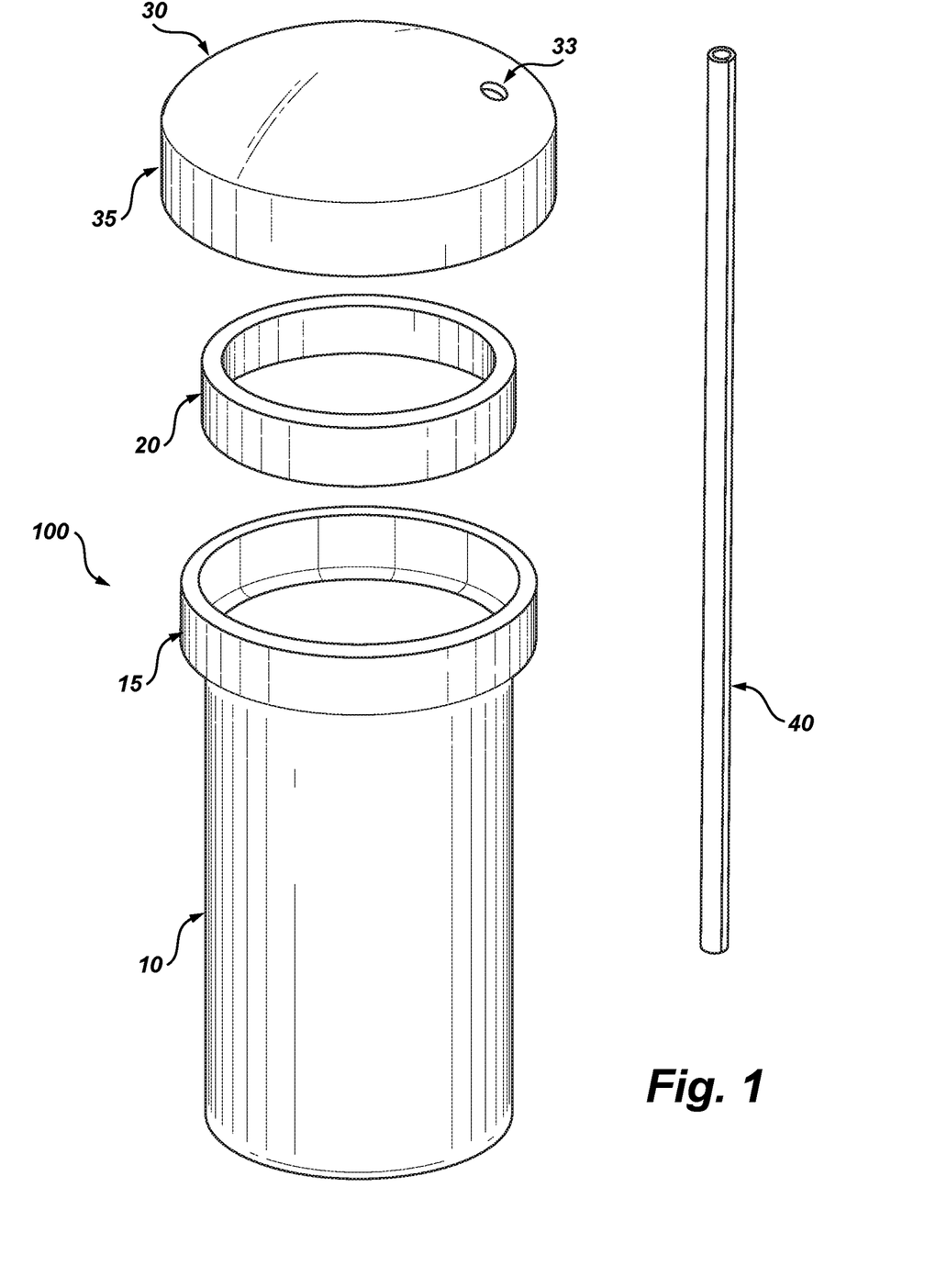
FIG. 1 is a front perspective view of the components of the magnetic drinking cup assembly.

FIG. 1 is a front perspective view of the components of the magnetic drinking cup assembly constructed in accordance with the invention. Magnetic drinking cup assembly 100 contains four components. Shown are: a cup 10, a magnetic ring 20, a lid 30, and a reusable straw 40. These components are easily detachable from each other to enable ease of cleaning for each component individually.

The cup 10 has an inner surface and an outer surface. The inner surface has an indentation, which is designed to securely hold the magnetic ring 20. The outer surface has an exterior upper edge 15, which creates the exterior border of the indentation. Magnetic ring 20 is removable as it can be placed inside the cup and taken out of the cup, as needed.

In the preferred embodiment a drinking cup is shown. However, in other embodiments, any food or beverage storage container can be used including, but not limited to: a bowl, a serving dish, and a bottle.

The lid 30 contains a straw hole 33 to be used for easy insertion of the reusable straw 40. The lid has a base 35, which creates a bottom border around its circumference.

Figure 2:
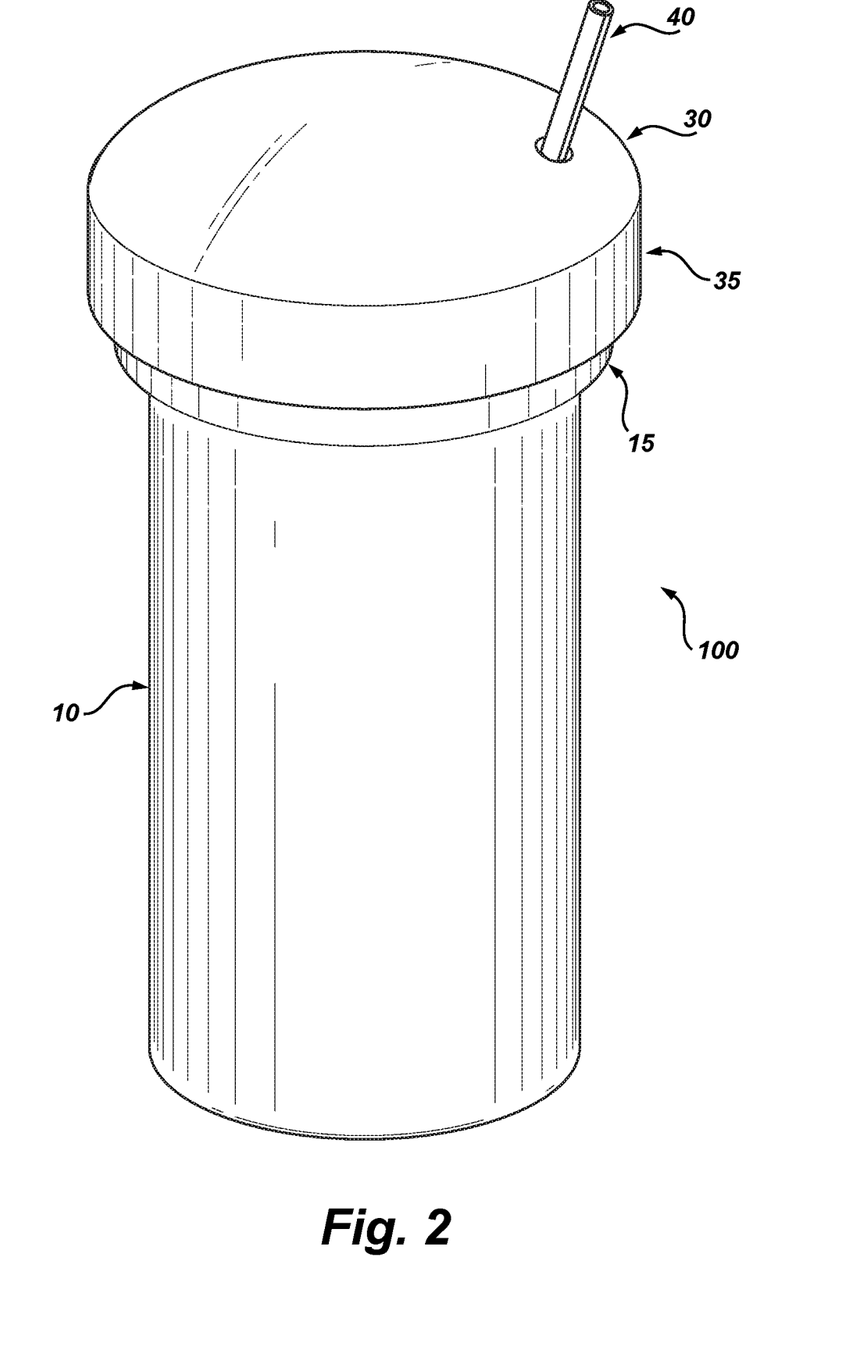
FIG. 2 is a front perspective view of the magnetic drinking cup assembly in a closed position.

FIG. 2 is a front perspective view of the magnetic drinking cup assembly 100 in a closed position. The lid 30 can be pressed down to close the cup, such that its border 35 overlaps with the cup's exterior upper edge 15, mating the lid with the cup. In this closed position, not shown is the magnetic ring, which is sitting inside of the cup 10 on an indentation behind the cup's upper edge 15. Reusable straw 40 is shown as inserted into the straw hole enabling a user to drink from the cup in this position.

Not shown in this Figure is a metal strip, which is embedded within the lid's border 35. Also not shown, is a magnetic strip enclosed within the magnetic ring. The lid and the cup are securely mated together through a magnetic attraction, which is further explained in the sections to follow.

In the current embodiment, the cup is constructed of a plastic material. However, in other embodiments, the cup can be constructed of silicone and glass. The lid, straw, and metallic ring are constructed of silicone material to enable maximum elasticity. Additionally, in the current embodiment, the straw's height is 9.5 inches, while the cup's height is 8 inches. The components of this invention can vary in range of elasticity, as well as, in thickness and in size. Magnetic drinking cup assembly can be constructed with any material having similar or more proficient elasticity, magnetic, and adjustability properties, as would be well known to those skilled in the art. Further, the magnetic drinking cup assembly can be made in any preferred color or design, customizable or pre-printed.

Figure 3:
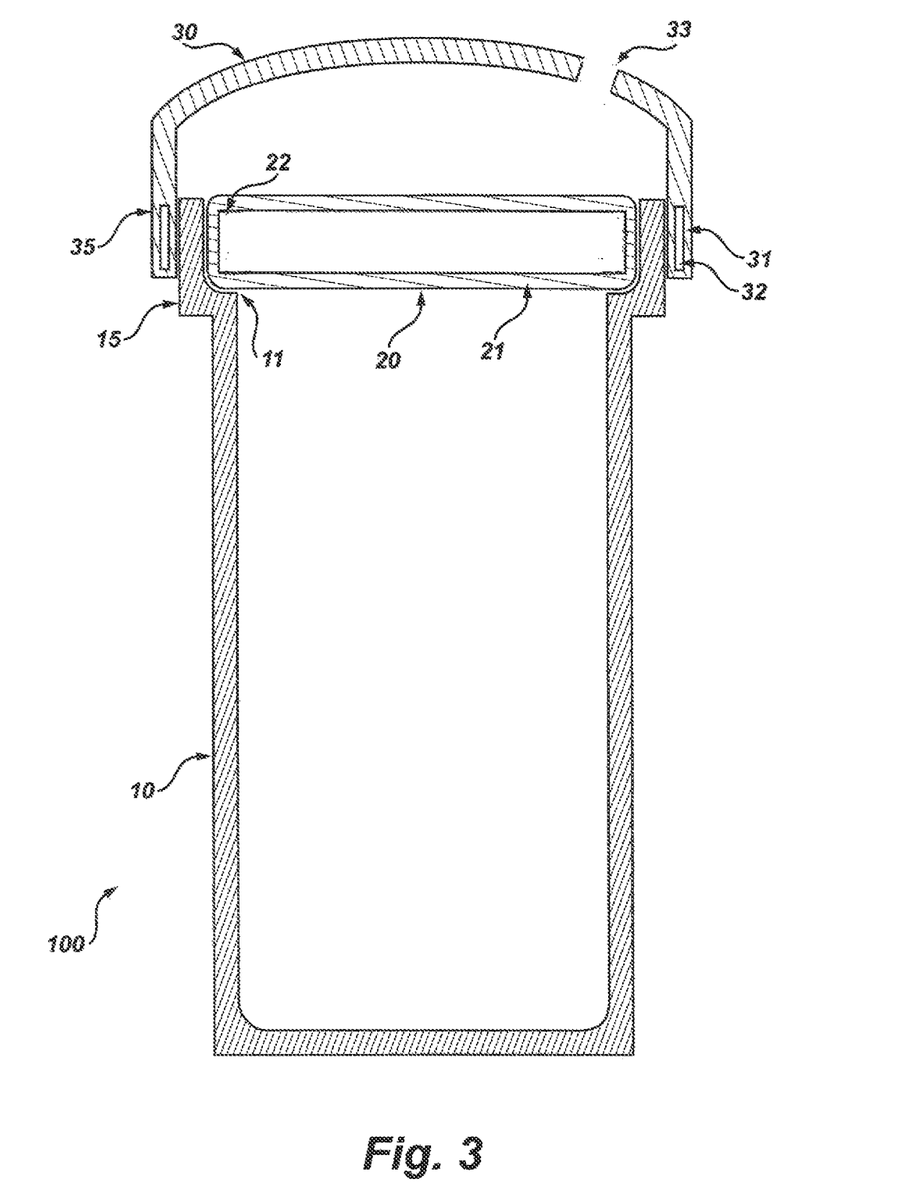
FIG. 3 is a cross sectional view of the front perspective view of the magnetic drinking cup assembly in a closed position.

FIG. 3 is a cross sectional view of the front perspective of the magnetic drinking cup assembly 100 in a closed position. As shown in greater detail, the magnetic ring 20 is sitting on an indentation 11 of cup 10. This cross sectional view of the magnetic ring 20 shows that a magnetic strip 22 is encased in a silicone material 21. The silicone material encompasses the magnetic strip 22, such that only the silicone is visible from the outside.

The cross sectional view of the lid 30 pressed down into its closed position shows a metal strip 32 encased within the lid's silicone material 31. In this position, the magnetic strip 22 of the magnetic ring 20 is magnetically attracted to the metal strip 32 of the lid 30. This magnetic attraction enables the lid's border 35 to mate with the cup's upper edge 15 to securely keep the magnetic cup assembly in a closed position.

Figure 4:
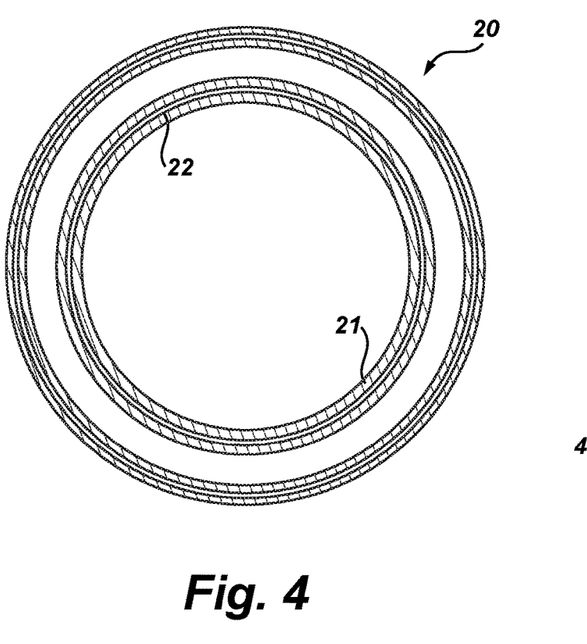
FIG. 4 is a top cross sectional view of the magnetic ring.

FIG. 4 is a top cross sectional view of the magnetic ring 20. A thin magnetic strip 22 in encased in silicone material 21. In the preferred embodiment, the magnetic strip 22 is formed of a flexible magnet that is similar to injection-molded magnets and produced in flat strips or sheets that are less than ¼ inch thick. In other embodiments, various forms of magnets or magnetic materials can be used for magnetic strip 22, including but not limited to: rare earth magnets, ceramic magnets, plastic magnets, alnico magnets, magnetic material in a powdered form mixed with polymer resins, and electromagnets. The size and thickness of the silicone layer can vary according to the preferred size of user's cup.

Figure 5:
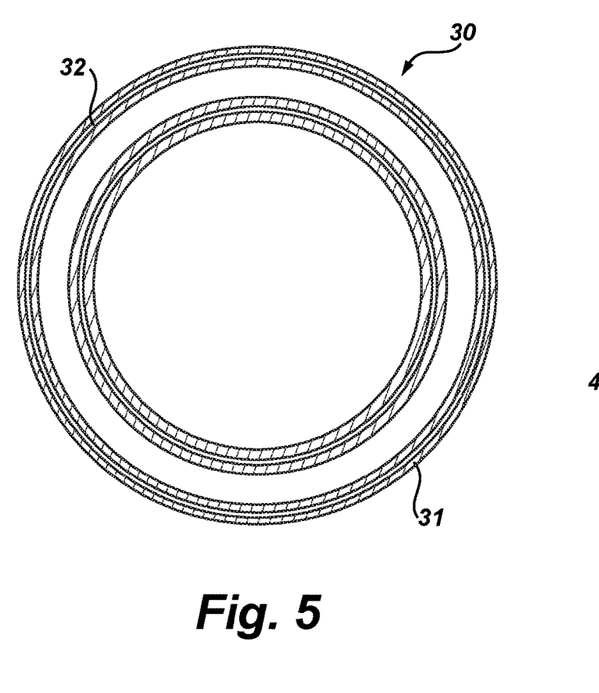
FIG. 5 is a top cross sectional view of the lid.

FIG. 5 is a top cross sectional view of the silicone lid 30. A thin metal strip 32 is encased in silicone material 31. In the preferred embodiment, the metal strip 32 is formed of steel. In other embodiments, iron, nickel, cobalt and other ferromagnetic materials may be used. The size and thickness of the silicone material can vary according to the preferred size of user's cup.

In the preferred embodiment, the metal strip is encased in the silicone lid and the magnetic strip is encased in the magnetic ring. In another embodiment, the metal strip and the magnetic strip can be switched such that the magnetic strip is in the silicone lid. In this embodiment, the magnetic strip is magnetically attracted the a metal strip found inside of the ring sitting inside of the cup.

Figure 6:
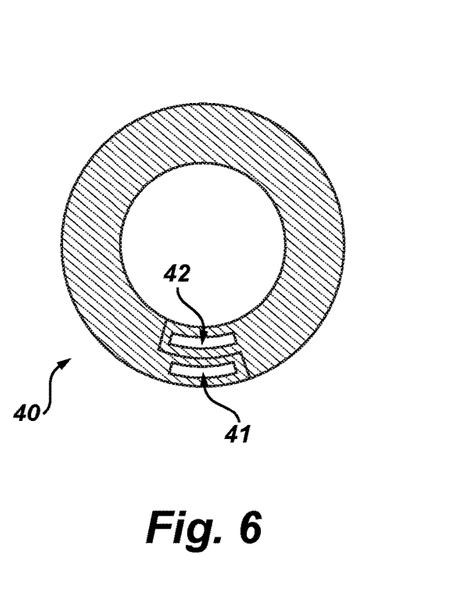
FIG. 6 is a top cross sectional view of the straw in a closed position.

FIG. 6 is a top cross sectional view of the drinking straw 40 in its closed position. A thin magnetic strip 42 runs along the vertical axis edge of the drinking straw, and a thin metal strip 41 runs along another vertical axis edge of the drinking straw. In this closed position, the magnetic strip 42, which is on one vertical edge of straw 40, is magnetically attracted to the metal strip 41, which is on the other vertical edge of the straw 40. This magnetic attraction enables the two edges of the straw to securely mate with each other to keep the straw in a closed position.

In the preferred embodiment, the magnetic strip 42 is formed of a flexible magnet that is similar to injection-molded magnets and produced in flat strips or sheets that are less than 2 mm thick. In other embodiments, various forms of magnets or magnetic materials can be used for magnetic strip 42, including but not limited to: rare earth magnets, ceramic magnets, plastic magnets, alnico magnets, magnetic material in a powdered form mixed with polymer resins, and electromagnets. Also, in the preferred embodiment, the metal strip 41 is formed of steel. In other embodiments, iron, nickel, cobalt and other ferromagnetic materials may be used. The straw has a diameter of 11 mm and a thickness of 2.5 mm. However, the size and thickness of the straw can vary according to the preferred size of user's cup and straw hole.

Figure 7:
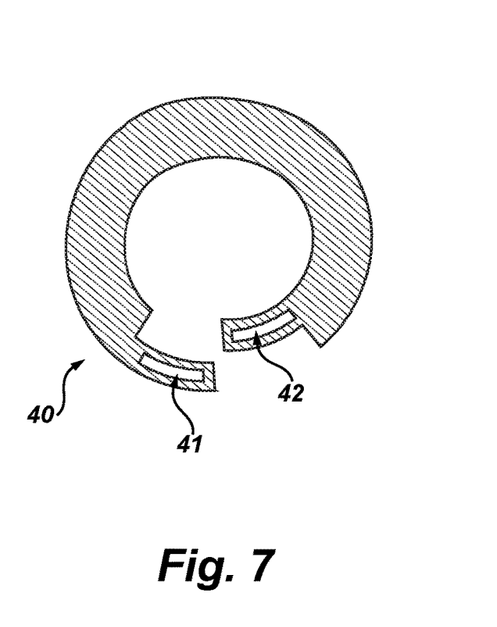
FIG. 7 is a top cross sectional view of the straw in an open position.

FIG. 7 is a top cross sectional view of the drinking straw 40 in an open position. The magnetic strip 42 can be pulled apart from metal strip 41 enabling the straw to be opened into a sheet-like shape or to reveal a flat material. This allows for a user to access the entire body of the straw easily for cleaning. In the preferred embodiment, the two edges of the straw can be pulled apart. In another embodiment, the edges of the straw have a small tag on each side, which a user can use to pull the two edges of the straw apart.

Figure 8:
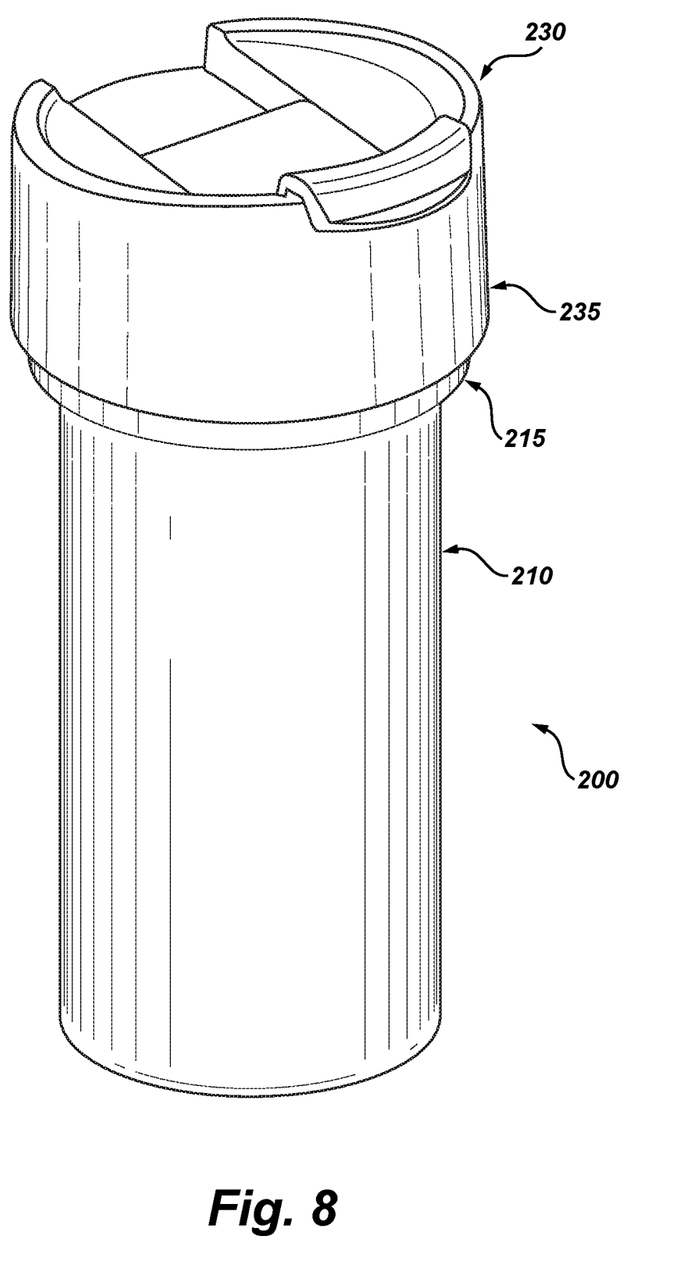
FIG. 8 is another embodiment of the magnetic drinking cup with a varying lid.

FIG. 8 shows a magnetic drinking assembly 200, which includes another embodiment of the lid. In lieu of a lid with a straw hole, a flip-top spout lid 230 is shown. The flip top spout lid includes a magnetic strip in its flip-top spout and a metal strip on the top surface of the lid. The metal strip is mated to the flip-top spout by a magnetic attraction, which keeps the flip-top spout in a secure closed position. The lid 230 is then mated to the cup 210 by the magnetic attraction between the metal strip in its border 235 and the magnetic ring sitting behind the upper edge 215, just as in the embodiment described in FIGS. 1-7 above.

Figure 9:
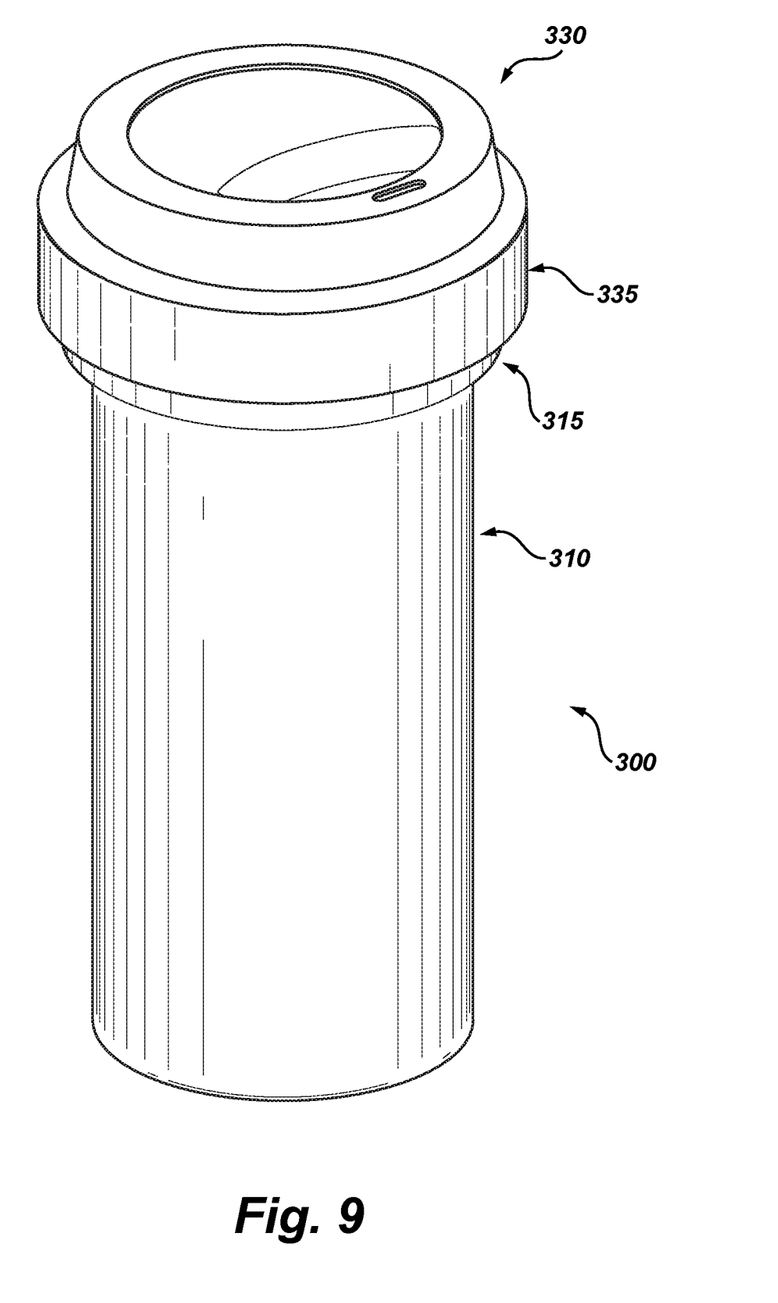
FIG. 9 is another embodiment of the magnetic drinking cup with a varying lid.

FIG. 9 shows a magnetic drinking assembly 300, which includes another embodiment of the lid. In lieu of a lid with a straw hole, a sippy cup spout lid 330 is shown. The lid 330 is then mated to the cup 310 by the magnetic attraction between the metal strip in its border 335 and the magnetic ring sitting behind the upper edge 315, just as in the embodiment described in FIGS. 1-7 above.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A magnetic drinking cup assembly comprising:
   a container having an inner surface containing an indentation, and an outer surface;
   a removable magnetic ring that sits on the indentation of the container's inner surface;
   a lid having a metal strip embedded within its base and a straw hole in its top surface;

a removable magnetic straw that has along its vertical axis a magnetic strip and a metal strip that are magnetically attracted to each other, enabling the straw to be opened and closed along its vertical axis;

wherein the lid is mated to the outer surface of the container by a magnetic attraction between the magnetic ring sitting in the container's inner surface and the metal strip of the lid.

2. The magnetic drinking cup assembly of claim 1 wherein the magnetic ring comprises a flexible magnetic strip coated in silicone material.

3. The magnetic drinking cup assembly of claim 2, wherein the magnetic ring has a circular cross section.

4. The magnetic drinking cup assembly of claim 1 wherein the lid is made of silicone material.

5. The magnetic drinking cup assembly of claim 4, wherein the lid has a circular cross section.

6. The magnetic drinking cup assembly of claim 1 wherein the lid has a sippy cup spout.

7. The magnetic drinking cup assembly of claim 1 wherein the lid has a flip-top spout having a magnetic strip.

8. The magnetic drinking cup assembly of claim 7 wherein the lid has a metal strip on its top surface that is mated to the flip top spout by a magnetic attraction between the metal strip on the lid and the magnetic strip in the flip top spout.

9. The magnetic drinking cup assembly of claim 1, wherein the container can be comprised from the group consisting of: a cup, a bowl, a storage container, a serving dish, and a bottle.

10. The magnetic drinking cup assembly of claim 9, wherein the container can be comprised of material from the group consisting of: silicone, glass, and plastic.

* * * * *